United States Patent
Kurnaz et al.

(10) Patent No.: US 11,420,559 B2
(45) Date of Patent: Aug. 23, 2022

(54) APPARATUS AND METHOD FOR GENERATING A COMPOSITE IMAGE FROM IMAGES SHOWING ADJACENT OR OVERLAPPING REGIONS EXTERNAL TO A VEHICLE

(71) Applicant: JAGUAR LAND ROVER LIMITED, Coventry (GB)

(72) Inventors: Ersin Kurnaz, Warwickshire (GB); Martin Edney, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 16/486,348

(22) PCT Filed: Feb. 2, 2018

(86) PCT No.: PCT/EP2018/052654
§ 371 (c)(1),
(2) Date: Aug. 15, 2019

(87) PCT Pub. No.: WO2018/149665
PCT Pub. Date: Aug. 23, 2018

(65) Prior Publication Data
US 2020/0023772 A1 Jan. 23, 2020

(30) Foreign Application Priority Data
Feb. 16, 2017 (GB) .................................... 1702533

(51) Int. Cl.
*B60R 1/00* (2022.01)
*B60R 11/04* (2006.01)
(Continued)

(52) U.S. Cl.
CPC ................ *B60R 1/00* (2013.01); *B60R 11/04* (2013.01); *G06T 5/007* (2013.01); *G06T 5/50* (2013.01);
(Continued)

(58) Field of Classification Search
CPC .............. B60R 1/00; B60R 11/04; G06T 5/50
See application file for complete search history.

(56) References Cited

U.S. PATENT DOCUMENTS

2007/0225913 A1* 9/2007 Ikeda .................... G08G 1/167
382/104
2009/0033744 A1 2/2009 Frantz
(Continued)

FOREIGN PATENT DOCUMENTS

| CN | 105946719 A | 9/2016 |
|---|---|---|
| GB | 2529408 A | 2/2016 |
| JP | 2008248613 A | 10/2008 |

OTHER PUBLICATIONS

International Search Report and Written Opinion, PCT/EP2018/052654, dated Apr. 19, 2018.
Search and Examination Report, GB1702533.9, dated Jul. 24, 2017.

*Primary Examiner* — Zhubing Ren
(74) *Attorney, Agent, or Firm* — McCoy Russell LLP

(57) ABSTRACT

Embodiments of the present invention provide a display method for use in a vehicle. The method comprises: obtaining first and second images showing adjacent or overlapping regions external to the vehicle, the first and second images being captured at different points in time; obtaining (904) at least one image property for each of the first and second images; calculating (914) an image correction factor as a function of the at least one image property for each of the first and second images; adjusting (914) the appearance of the first image and/or the second image according to the calculated image correction factor; generating (908) a com-
(Continued)

posite image from the first image or an adjust first image and the second image or an adjusted second image; and displaying at least part of the composite image; wherein for at least one of the first and second image, the at least one obtained image property is in respect of a group of images including the first or second image. A corresponding display apparatus, for use in a vehicle, to implement the method is also provided, along with a computer program product storing computer program code which is arranged when executed to implement the method and a vehicle including the apparatus.

17 Claims, 7 Drawing Sheets

(51) Int. Cl.
*G06T 5/00* (2006.01)
*G06T 5/50* (2006.01)

(52) U.S. Cl.
CPC ... *B60R 2300/105* (2013.01); *B60R 2300/303* (2013.01); *B60R 2300/802* (2013.01); *G06T 2207/20221* (2013.01); *G06T 2207/30252* (2013.01)

(56) References Cited

U.S. PATENT DOCUMENTS

| | | | |
|---|---|---|---|
| 2010/0060735 A1* | 3/2010 | Sato | H04N 7/181 348/148 |
| 2010/0066833 A1* | 3/2010 | Ohshima | B60R 1/00 348/148 |
| 2014/0152778 A1* | 6/2014 | Ihlenburg | H04N 13/324 348/47 |
| 2016/0328629 A1* | 11/2016 | Sinclair | G06T 7/254 |
| 2017/0274822 A1* | 9/2017 | Haggerty | B60R 1/00 |
| 2017/0372147 A1* | 12/2017 | Stervik | G06K 9/00791 |

\* cited by examiner

APPARATUS AND METHOD FOR GENERATING A COMPOSITE IMAGE FROM IMAGES SHOWING ADJACENT OR OVERLAPPING REGIONS EXTERNAL TO A VEHICLE

CROSS-REFERENCE TO RELATED APPLICATIONS

This application is a 371 of International Application No. PCT/EP2018/052654, filed Feb. 2, 2018, which claims priority to GB Patent Application 1702533.9, filed Feb. 16, 2017, the contents of both of which are incorporated by reference herein in their entirety.

TECHNICAL FIELD

The present invention relates to an apparatus and method for displaying information. Particularly, but not exclusively, the present invention relates to a display method for use in a vehicle and a display apparatus for use in a vehicle. Aspects of the invention relate to a display method, a computer program product, a display apparatus and a vehicle.

BACKGROUND

It is becoming commonplace for vehicles to be provided with one or more video cameras to provide live video images (or still images) of the environment surrounding a vehicle. Furthermore, it is known to combine live images and time delayed images to form a composite image in order to reveal information about the environment surrounding the vehicle, visible in the time delayed images, but subsequently obscured by a portion of the vehicle as the vehicle moves. However, the composite image may still appear disjointed. Such a composite image may include discontinuities including colour and exposure mismatches. If uncorrected, composite image discontinuities may cause users to lose confidence in the accuracy of the information presented in a composite image, or to assume that there is a malfunction.

It is an object of embodiments of the invention to at least mitigate one or more of the problems of the prior art. It is an object of certain embodiments of the invention to reduce the appearance of discontinuities within a composite image formed from live images and time delayed images.

SUMMARY OF THE INVENTION

Aspects and embodiments of the invention provide a display method, a computer program product, a display apparatus and a vehicle as claimed in the appended claims.

According to an aspect of the invention, there is provided a display method for use in a vehicle, the method comprising: obtaining first and second images showing adjacent or overlapping regions external to the vehicle, the first and second images being captured at different points in time; obtaining at least one image property for each of the first and second images; calculating an image correction factor as a function of the at least one image property for each of the first and second images; adjusting the appearance of the first image and/or the second image according to the calculated image correction factor; generating a composite image from the first image or an adjusted first image and the second image or an adjusted second image; and displaying at least part of the composite image; wherein for at least one of the first and second image, the at least one obtained image property is in respect of a group of images including the first or second image.

The group of images including the first or second image may comprise two or more images captured consecutively by a single image capture apparatus.

The image property obtained in respect of the group of images including the first or second image may comprise an average of image properties obtained in respect of each of the group of images.

The first and second images may be captured by at least one image capture apparatus mounted upon or within the vehicle to capture images of the environment external to the vehicle. The image capture apparatus may comprise a visible light camera, a camera sensitive to infrared and/or ultraviolet band light, and/or a scanning laser or lidar arranged to scan a region of the environment external to the vehicle and to provide information pertaining to the environment in that region. The image captured by this apparatus may comprise still or moving images and may additionally or alternatively comprise range data including a cloud of points, each point relating to the distance to a surface or object external to the vehicle.

The at least one image property may be indicative of a characteristic of the image, a setting of at least one image capture apparatus used to capture the image or an environmental factor at the time the image was captured.

The first image may be captured at a first point in time and the second image is captured at a second, later point in time, the vehicle having moved position between the first and second points in time.

The first image may be buffered prior to its use to generate a composite image.

The at least one image property in respect of the first image may be stored in association with the first image.

The first image may be a time-delayed image and the second image may be a live image.

The first and second images may be captured by a single vehicle mounted camera or separate vehicle mounted cameras.

Adjusting the appearance of the first image and/or the second image according to the calculated image correction factor may comprise adjusting the whole or only a portion of the selected first and/or second image.

For at least one of the first or second image the obtained at least one image property may be in respect of the whole or only a portion of said image.

The portion of the image may comprise an image portion which overlaps with or is adjacent to the other of the first and second images.

The at least one image property may comprise at least one of a white balance, image gamma, dynamic range, Chroma and colour saturation.

The composite image may comprise a 3-Dimensional, 3D, representation or a 2-Dimensional, 2D, representation of the environment surrounding the vehicle and extending at least partially underneath the vehicle.

The composite image may be displayed to overlie a portion of an image of the vehicle to be indicative of said portion of said image of the vehicle being at least partly transparent.

According to a further aspect of the invention, there is provided a computer program product storing computer program code which is arranged when executed to implement the above method.

According to a further aspect of the invention, there is provided a display apparatus for use with a vehicle, comprising: image capture apparatus arranged to obtain first and second images showing adjacent or overlapping regions external to the vehicle, the first and second images being captured at different points in time; a display means arranged to display a composite image; a storage means arranged to store image data; and a processing means arranged to: obtain at least one image property for each of the first and second images; calculate an image correction factor as a function of the at least one image property for each of the first and second images; adjust the appearance of the first image and/or the second image according to the calculated image correction factor; generate a composite image from the first image or an adjusted first image and a second image or an adjusted second image; and cause the display means to display at least part of the composite image; wherein for at least one of the first and second image, the at least one obtained image property is in respect of a group of images including the first or second image.

A display apparatus as described above, wherein the image obtaining means comprises a camera or other form of image capture device arranged to generate and output still images or moving images. The display means may comprise a display screen, for instance a LCD display screen suitable for installation in a vehicle. Alternatively, the display may comprise a projector for forming a projected image. The processing means may comprise a controller or processor, suitably the vehicle ECU.

The processing means may be further arranged to implement the above method.

According to a further aspect of the invention, there is provided a vehicle comprising the above display apparatus.

According to a further aspect of the invention, there is provided a display method, a display apparatus or a vehicle substantially as herein described with reference to FIGS. 9, 10 and 3 respectively of the accompanying drawings.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying figures, in which.

DETAILED DESCRIPTION

Figure 1:
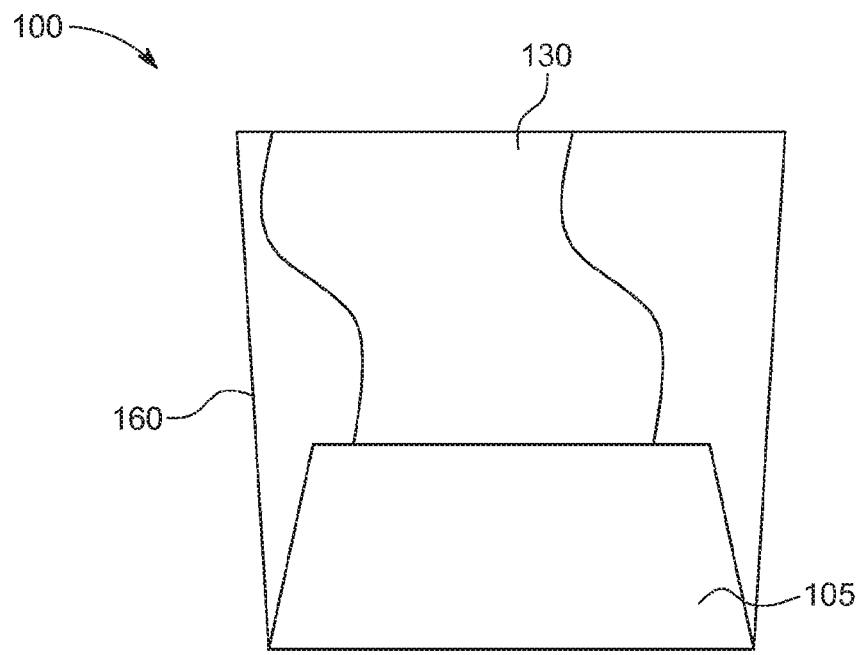
FIG. 1 shows an illustration of a typical view from a conventional vehicle.

FIG. 1 illustrates a typical view 100 from a conventional vehicle. The view is from an interior of the vehicle through a windscreen or windshield 110 of the vehicle viewing forwards. A portion of a bonnet or hood 105 of the vehicle is visible extending forward from beneath the windscreen 160. The vehicle is travelling along a roadway 130 which is visible from the vehicle. As can be appreciated, the bonnet 105 obscures the view of the roadway 130 close the vehicle. This problem is exacerbated when the vehicle is inclined with respect to the roadway 130 ahead of the vehicle i.e. when an angle between the vehicle and the roadway ahead is increased, such as when the vehicle is at a top of a crest (and approaching, but not yet descending a slope) or is inclined upward on a small undulation,. In these situations the roadway 130 may have reduce visibility from the vehicle particularly due to being obscured by the bonnet 105.

More generally, it may be considered that from the viewing position of the driver the view of the roadway 130 ahead is partially occluded both by external portions of the vehicle (especially the bonnet) and internal portions of the vehicle, for instance the bodywork surrounding the windscreen 160 and the dashboard. In the following description of the invention, where reference is made to the view of the driver or from the driver's position, this should be considered to encompass the view of a passenger, though clearly for manually driven vehicles it is the driver's view that is of paramount importance. In particular, it is portions of the roadway 130 close to the front of the vehicle that are occluded. It will be appreciated that the driver's view of the environment surrounding the vehicle on all sides is similarly restricted by the field of view available through each vehicle window from the driver's viewing position. In general, a driver is unable to see portions of the environment close to the vehicle due to restrictions imposed by vehicle bodywork.

As noted above it is becoming commonplace for vehicles to be provided with at least one image capture apparatus, such as video cameras, arranged to provide live video images (or still images) of the environment surrounding a vehicle. Such images may then be displayed for the benefit of the driver, for instance on a dashboard mounted display screen. In particular, it is well-known to provide at least one camera towards the rear of the vehicle directed generally behind the vehicle and downwards to provide live video images to assist a driver who is reversing (it being the case that the driver's natural view of the environment immediately behind the vehicle is particularly limited). It is known to provide multiple such camera systems to provide live imagery of the environment surrounding the vehicle on multiple sides, for instance displayed on a dashboard mounted display screen. For instance, a driver may selectively display different camera views in order to ascertain the locations of objects close to each side of the vehicle. Such cameras may be positioned externally mounted upon the vehicle, or internally and directed outwards and downwards through the vehicle glass in order to capture images. It will be appreciated by one skilled in the art that the image capture apparatus may comprise one or more visible light camera, a camera sensitive to infrared and/or ultraviolet band light, and/or a scanning laser or lidar arranged to scan a region of the environment external to the vehicle and to provide information pertaining to the environment in that region. The image captured by this apparatus may comprise still or moving images and may additionally or alternatively comprise range data including a cloud of points, each point relating to the distance to a surface or object external to the vehicle. The following examples provided herein use visible light video cameras as their image capture apparatus, but it will be appreciated that other forms of image capture apparatus, as hereinbefore described may be user additionally or alternatively as may be desired for a given vehicle.

Figure 3:
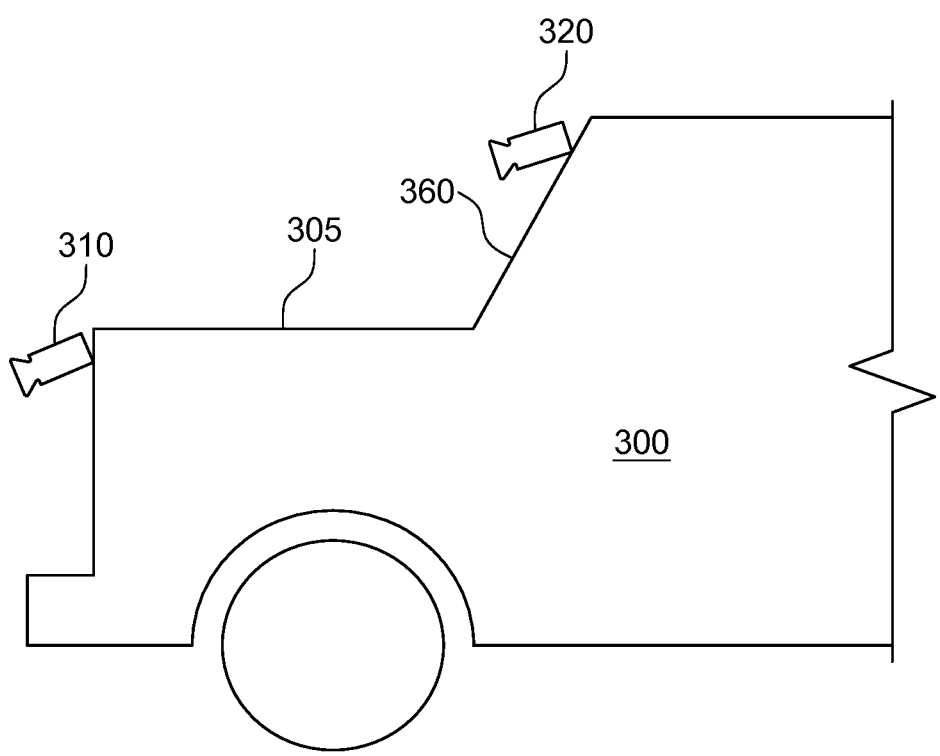
FIG. 3 illustrates a portion of a vehicle operating to provide the improved view of FIG. 2.

Such cameras may be positioned externally and mounted upon exterior of the vehicle, or internally, their lenses and directed outwards and, depending on their height above the ground, downwards, viewing through the windscreen or other vehicle glass in order to capture images. Such cameras may be provided at varying heights, for instance generally at roof level, driver's eye level or some suitable lower location to avoid vehicle bodywork obscuring their view of the environment immediately adjacent to the vehicle. FIG. 3 provides an example of a camera that is mounted upon a front of the vehicle to view forwards there-from in a driving direction of the vehicle. Where the images concerned are to another side of the vehicle then clearly the camera position will be appropriately located.

However, the underneath of a vehicle is not a promising area for image capture due to it being poorly lit. Furthermore, cameras located generally underneath a vehicle are exposed to a significant risk of obscuration due to mud and water splashing onto the camera lens or risk of damage due to contact with objects such as rocks.

Figure 2:
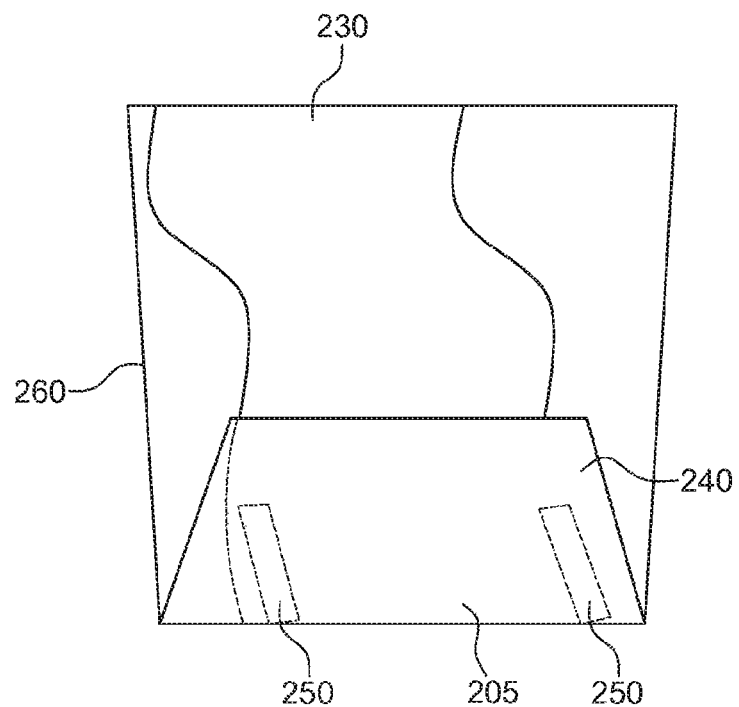
FIG. 2 shows an illustration of an improved view from a vehicle.

One solution to the above described problem of poor visualisation of the roadway ahead of a vehicle will now be described in relation to FIGS. 2 and 3. The vehicle may be a land-going vehicle, such as a wheeled vehicle. FIG. 2 illustrates an improved forward view 200. Again, as with FIG. 1, in FIG. 2, the vehicle is travelling along a path or roadway 230 which is visible to the driver from within the vehicle. The view 200 is from an interior of the vehicle forwards through a windscreen or windshield 260 of the vehicle, as in FIG. 1. A portion of a bonnet or hood 205 of the vehicle is visible extending forward from beneath the windscreen 260.

The vehicle shown in FIG. 2 comprises a display means which is arranged to display information 240, 250 thereon. The information 240, 250 is displayed so as to overlie a portion of the vehicle. The overlaid displayed information provides the impression of a portion of the vehicle being at least partly transparent from the perspective of the driver. The displayed information provides a representation of what would be visible along a line of sight through the vehicle, were it not for the fact that a portion of the vehicle is occluding that line of sight.

As shown in FIG. 2, the information 240, 250 is displayed to overlie a portion of the vehicle's body, in this case the bonnet 205 of the vehicle. It will be realised that by extension information 240, 250 may be displayed to overlie other internal or external portions of the vehicle. The information 240, 250 is arranged to overlie the bonnet 205 of the vehicle from a point of view of the driver of the vehicle. The display means may be arranged to translucently display information 240, 250 thereon such that the portion of the vehicle body may still be perceived, at least faintly, underneath the displayed information.

The display means may comprise a head-up display means for displaying information in a head-up manner to at least the driver of the vehicle. The head-up display may form part of, consist of or be arranged proximal to the windscreen 260 such that the information 240, 250 is displayed to overlie the bonnet 205 of the vehicle from the point of view of the vehicle driver. By overlie it is meant that the displayed information 240, 250 appears upon (or in front of) the bonnet 205. Where images of other portions of the environment surrounding the vehicle are to be displayed, the head-up display may be similarly arranged relative to another window of the vehicle. An alternative is for the display means to comprise a projection means. The projection means may be arranged to project an image onto an interior portion of the vehicle, such as onto a dashboard, door interior, or other interior components of the vehicle. The projection means may comprise a laser device for projecting the image onto the vehicle interior.

A method of providing the improved view of FIG. 2 begins with obtaining information associated with the vehicle, or image data. The information or image data may be obtained by a processing means, such as a processing device. The information associated with the vehicle may for instance be associated with one of a steering system of the vehicle, one or more wheels of the vehicle or suspension of the vehicle. In the described example the information is a steering angle of the wheels. The information may be obtained by the processing device from one or more steering angle sensors. The information may be obtained by the processing device receiving information from a communication bus of the vehicle, such as a CAN bus, although the communication bus may be based on other protocols such as Ethernet. Other types of data communications bus are useful.

The image data may be for a region ahead of the vehicle. The image data may be obtained by the processing device from one or more image sensing means, such as cameras, associated with the vehicle. As will be explained in connection with FIG. 3, a camera may be mounted upon a front of the vehicle to view forwards there-from in a driving direction of the vehicle. Where the images concerned are to another side of the vehicle then clearly the camera position will be appropriately located. The camera may be arranged so as to obtain image data of the environment in front of the vehicle that is not obscured by the bonnet 205. As will be described in greater detail below, appropriate time shifting of the images as the vehicle moves forward allows for images corresponding to a view of the driver or a passenger without the bonnet 205 being present to be provided to the display means. That is, the display means may output image data that would be perceived by the driver if the bonnet 205 was not present i.e. not obstructing the driver's view.

As shown in FIG. 3, which illustrates a front portion of a vehicle 300 in side-view, a camera 310 may be mounted at a front of the vehicle lower than a plane of the bonnet 305, such as behind a grill of the vehicle 300. Alternatively, or in addition, a camera 320 may be positioned above the place of the bonnet 305, for instance at roof level or at an upper region of the vehicle's windscreen 360. The field of view of each camera may be generally forward and slightly downward to output image data for a portion of ground ahead of the vehicle's current location. Each camera outputs image data corresponding to a location ahead of the vehicle 300. It will be realised that the camera may be mounted in other locations, and may be moveably mounted to rotate about an axis. In an example, the moveably mounted camera may be rotated and or translated in use, such that a viewing angle of the camera is vertically controllable. A vertical position of the camera may also be controlled. The moveable camera may be arranged to view in a substantially constant horizontal axis regardless of an inclination of the vehicle. For example the camera may be arranged to view generally horizontally even when the vehicle is inclined. However it will be appreciated that the camera may be arranged to be oriented non-horizontally. The camera may be arranged to have a generally constant downward orientation so as to view, and provide image data corresponding to a region forward of the vehicle. When appropriately delayed, as will be described, the display means may display image data corresponding to a region forward of the vehicle which is obscured from the driver's view by the bonnet 305. The region may, for instance, be a region which is up to 10 or 20 m ahead of the vehicle.

The next step of the method for providing the improved view of FIG. 2 is to generate a graphical representation of at least one component of the vehicle having one or more characteristics based on the information associated with the vehicle, and a graphical representation of the image data. The representation, of at least one component and the image data, may be generated by a processing device. Alternatively, it may be that only the representation of at least one component or only the representation of the image data may be generated.

The representation, particularly of the image data although optionally also of the at least one component, may be generated so as to match, or correspond to, a perspective from a point of view of the driver. For example, an image processing operation may be performed on the image data to adjust a perspective of the image data. The perspective may be adjusted to match, or to be closer to, a perspective of a subject of the image data as viewed from the driver's position within the vehicle.

The image processing operation comprises a delay being introduced into the image data. The delay time may be based upon a speed of travel of the vehicle. The delay may allow the displayed representation based on the image data obtained from the camera to correspond to a current location of the vehicle. For example, if the image data is for a location around 20 m ahead of the vehicle the delay may allow the location of the vehicle to approach the location of the image data such that, when the representation is displayed, the location corresponding to the image data is that which is obscured from the passenger's view by the bonnet 205. In this way the displayed representation matches a current view of the driver. It will be appreciated that the delay may also be variable according to the driver's viewing position given that the driver's viewing position affects the portion of the roadway occluded by the bonnet 205. The image processing operation may be performed by the processing device.

Once generated, the representation is displayed. The representation is displayed so as to overlie a portion of the vehicle body, for example, the bonnet 205 from the viewer's point of view, such as the driver's point of view. The method may be performed continually in a loop until a predetermined event occurs, such as a user interrupting the method, for example by activating a control within the vehicle. It will be realised that the predetermined event may be provided from other sources.

The representation may be displayed upon a display apparatus provided within the vehicle such that the displayed information overlies a portion of the vehicle under the control of a processing device. The processing device may be further arranged to determine information associated with a vehicle, or to receive image data for a region ahead of the vehicle, and to cause the display device to display a graphical representation of at least one component of the vehicle having one or more characteristics based on the information associated with the vehicle, or a representation of the image data. The information received by the processing device may include a steering angle of the vehicle's wheels, or image data output by one or more cameras. The information or image data may be received by the processing device from a communication bus of the vehicle, or via a dedicated communication channel such as a video feed from the one or more cameras.

The graphic representation generated by the processing device may be a representation of the vehicle's wheels as shown in FIG. 2 and indicated generally at 250, although the representation may be of other components of the vehicle such as a suspension system, axle of the vehicle, an engine of the vehicle, or any other generally mechanical and/or structural component of the vehicle. The processing device may perform one or more image processing operations on the representation, such as altering a perspective of the image data and/or introducing a delay to the image data as described above. The perspective of the image data may be altered to match a viewing angle of the driver. The processing device may be arranged to receive image data corresponding to a view of the driver and to determine their viewing direction based thereon, such as based on the driver's eye position, or may receive data indicative of the driver's viewing direction from another sub-system of the vehicle. The image data may also be processed to adjust the representation to match a shape of the vehicle's body, for example to adjust for contours in the vehicle's bonnet shape.

The display device may comprises a projector for projecting light which is operably controlled by the processing device to project the representation by emitting light toward an optical combiner. The projection device and combiner together form a head-up display (HUD). When no light is being emitted by the projection device the combiner may be generally imperceptible to the driver of the vehicle, but when light is projected from the projection device and hits the combiner an image is viewed thereon by the passenger. The combiner is positioned such that an image viewed thereon by the driver appears to overlie a portion of the vehicle's body, such as the bonnet. That is the image appears above the bonnet. The displayed representation allows the driver to appreciate a location and direction of the vehicle's wheels and a position and direction of the path or roadway on which the vehicle is travelling, which is particularly useful for off-road driving. In addition to the representation of the wheel positions shown in FIG. 2, the HUD may display additional vehicle information, which might otherwise be presented to a driver through an alternative dashboard display, for instance vehicle speed.

For the improved forwards driver view described above in connection with FIGS. 2 and 3 an image is displayed to overlie an external portion of the vehicle. As noted previously, this concept is extensible to displaying an image derived from a camera capturing images of the environment surrounding a vehicle so as to also overlie at least a portion of an interior of the vehicle. As previously discussed, from the perspective of a driver a view external to the vehicle can be obscured by both the vehicle's body external to a passenger compartment of the vehicle, for instance the bonnet, and also by interior portions of the vehicle, such as the inside of a door or an instrument panel or dashboard. To address this broader problem, one or more further HUDs may be collocated with or incorporated into one or more vehicle windows other than the wind screen. Alternatively or in addition, an interior display means may provide an image interior to the vehicle for displaying one or both of image data and/or a representation of one or more components of the vehicle. The interior display means may comprise at least one projection device for projecting an image onto interior surfaces of the vehicle. The interior surfaces may comprise a dashboard, door interior or other interior surfaces of the vehicle. The projection device may be arranged in an elevated position within the vehicle to project the images downward onto the interior surfaces of the vehicle. The head-up display means and interior display means may be both communicatively coupled to a control device such as that illustrated in FIG. 5, which is arranged to divide image data for display there-between. By so doing, an image produced jointly between the head-up display means and interior display means provides a greater view of objects external to the vehicle. The view may be appreciated not only generally ahead of the driver, but also to a side of the driver or passenger when images are projected onto interior surfaces of the vehicle indicative of image data external to the vehicle and/or one or more components of the vehicle.

While the improved forwards view illustrated in FIG. 2 assists a driver to identify objects close to the front of the vehicle that are obscured by the bonnet, it is of no assistance once the objects have passed under the vehicle. The problem of the driver being unable to view the terrain underneath a vehicle may be addressed through the use of historic (that is, time delayed) video footage obtained from a vehicle camera system, for instance the vehicle camera system illustrated in FIG. 3. A suitable vehicle camera system comprises one or more video cameras positioned upon a vehicle to capture video images of the environment surrounding the vehicle which may be displayed to aid the driver.

Figure 4:
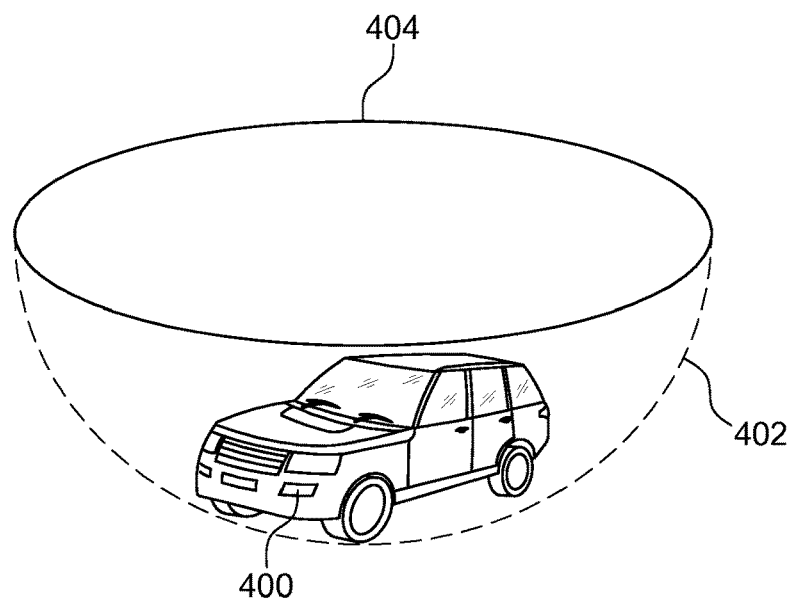
FIG. 4 illustrates a composite 3D image derived from vehicle mounted cameras.

It is known to take video images (or still images) derived from multiple vehicle mounted cameras and form a composite image illustrating the environment surrounding the vehicle. Referring to FIG. 4, this schematically illustrates such a composite image surrounding a vehicle 400. Specifically, the multiple images may be combined to form a 3-Dimensional (3D) composite image that may, for instance, be generally hemispherical as illustrated by outline 402. This combination of images may be referred to as stitching. The images may be still images or may be live video images. The composite image is formed by mapping the images obtained from each camera onto an appropriate portion of the hemisphere. Given a sufficient number of cameras, and their appropriate placement upon the vehicle to ensure appropriate fields of view, it will be appreciated that the composite image may thus extend all around the vehicle and from the bottom edge of the vehicle on all sides up to a predetermined horizon level illustrated by the top edge 404 of hemisphere 402. It will be appreciated that it is not essential that the composite image extends all of the way around the vehicle. For instance, in some circumstances it may be desirable to stitch only camera images projecting generally in the direction of motion of the vehicle and to either side—directions where the vehicle may be driven. This hemispherical composite image may be referred to as a bowl. Of course, the composite image may not be mapped to an exact hemisphere as the images making up the composite may extend higher or lower, or indeed over the top of the vehicle to form substantially a composite image sphere. It will be appreciated that the images may alternatively be mapped to any 3D shape surrounding the vehicle, for instance a cube, cylinder or more complex geometrical shape, which may be determined by the number and position of the cameras. It will appreciate that the extent of the composite image is determined by the number of cameras and their camera angles. The composite image may be formed by appropriately scaling and/or stretching the images derived from each camera to fit to one another without leaving gaps (though in some cases gaps may be left where the captured images do not encompass a 360 degree view around the vehicle).

The composite image may be displayed to the user according to any suitable display means, for instance the Head Up Display, projection systems or dashboard mounted display systems described above. While it may be desirable to display at least a portion of the 3D composite image viewed for instance from an internal position in a selected viewing direction, optionally a 2-Dimensional (2D) representation of a portions of the 3D composite image may be displayed. Alternatively, it may be that a composite 3D image is never formed—the video images derived from the cameras being mapped only to a 2D plan view of the environment surrounding the vehicle. This may be a side view extending from the vehicle, or a plan view such as is shown in FIG. 5.

Figure 5:
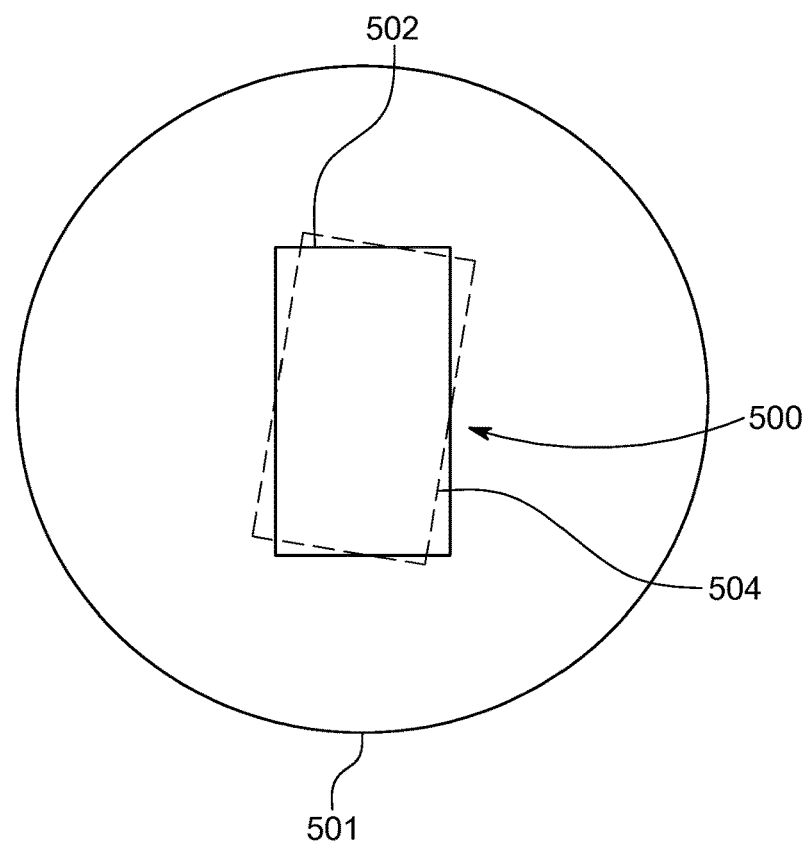
FIG. 5 illustrates a composite 2D image, specifically a bird's eye view, derived from vehicle mounted cameras.

FIG. 5 shows a composite image 501 giving a bird's eye view of the environment surrounding a vehicle 500, also referred to as a plan view. Such a plan view may be readily displayed upon a conventional display screen mounted inside the vehicle 500 and provides useful information to the driver concerning the environment surrounding the vehicle 500 extending up close to the sides of the vehicle 500. As discussed above, from the driving position it is difficult or impossible to see the ground immediately adjacent to the vehicle 500 and so the plan view of FIG. 5 is a significant aid to the driver. The ground underneath the vehicle 500 remains obscured from a camera live view and so may typically be represented in the composite image 501 by a blank region 502 at the position of the vehicle 500, or a representation of a vehicle 500 to fill the blank. Without providing cameras underneath the vehicle 500, which is undesirable as discussed above, for a composite image formed solely from stitched live camera images the ground underneath the vehicle cannot be seen.

In addition to the cameras being used to provide a composite live image of the environment surrounding the vehicle, historic images may be incorporated into the composite image to provide imagery representing the terrain under the vehicle—that is, the terrain within the boundary of the vehicle. By historic images, it is meant images that were captured previously by the vehicle camera system, for instance images of the ground in front of or behind the vehicle; the vehicle subsequently having driven over that portion of the ground. The historic images may be still images or video images or frames from video images. Such historic images may be used to fill the blank region 502 in FIG. 5. It will be appreciated that particularly for off road situations the ability to see the terrain in the area under the vehicle (strictly, a representation of the terrain derived from historic images captured before the vehicle obscured the terrain) allows the driver to perform fine adjustment of the vehicle position and in particular the vehicle wheels. As for the improved view of FIG. 2, in addition to this composite image formed from live and historic video imagery, representations of vehicle systems, for instance the wheel positions, may also be incorporated into the composite image. The above description in relation to FIG. 2 regarding the obtaining of information about vehicle systems and the generation of representations of such vehicle systems should be considered to apply equally to the discussion of a composite image below.

The composite image may be formed by combining the live and historic video images, and in particular by performing pattern matching to fit the historic images to the live images thereby filling the blind spot in the composite image comprising the area under the vehicle. The surround camera system comprises at least one camera and a buffer arranged to buffer images as the vehicle progresses along a path. The vehicle path may be determined by any suitable means, including but not limited to a satellite positioning system such as GPS (Global Positioning System), IMU (Inertial Measurement Unit), wheel ticks (tracking rotation of the wheels, combined with knowledge of the wheel circumference) and image processing to determine movement according to shifting of images between frames. At locations where the blind spot from the live images overlaps with buffered images, the area of the blind spot copied from delayed video images is pattern matched through image processing to be combined with the live camera images forming the remainder of the composite image.

There will now be described a method for displaying the position of all wheels of a vehicle and the vehicle underbody clearance combined with live images of the environment surrounding the vehicle. This provides for improved driver information to allow them to progress safely and with confidence, particularly when travelling through rough terrain. The use of pattern matching provides particular improvements in the combining of live and historic images.

Figure 6:
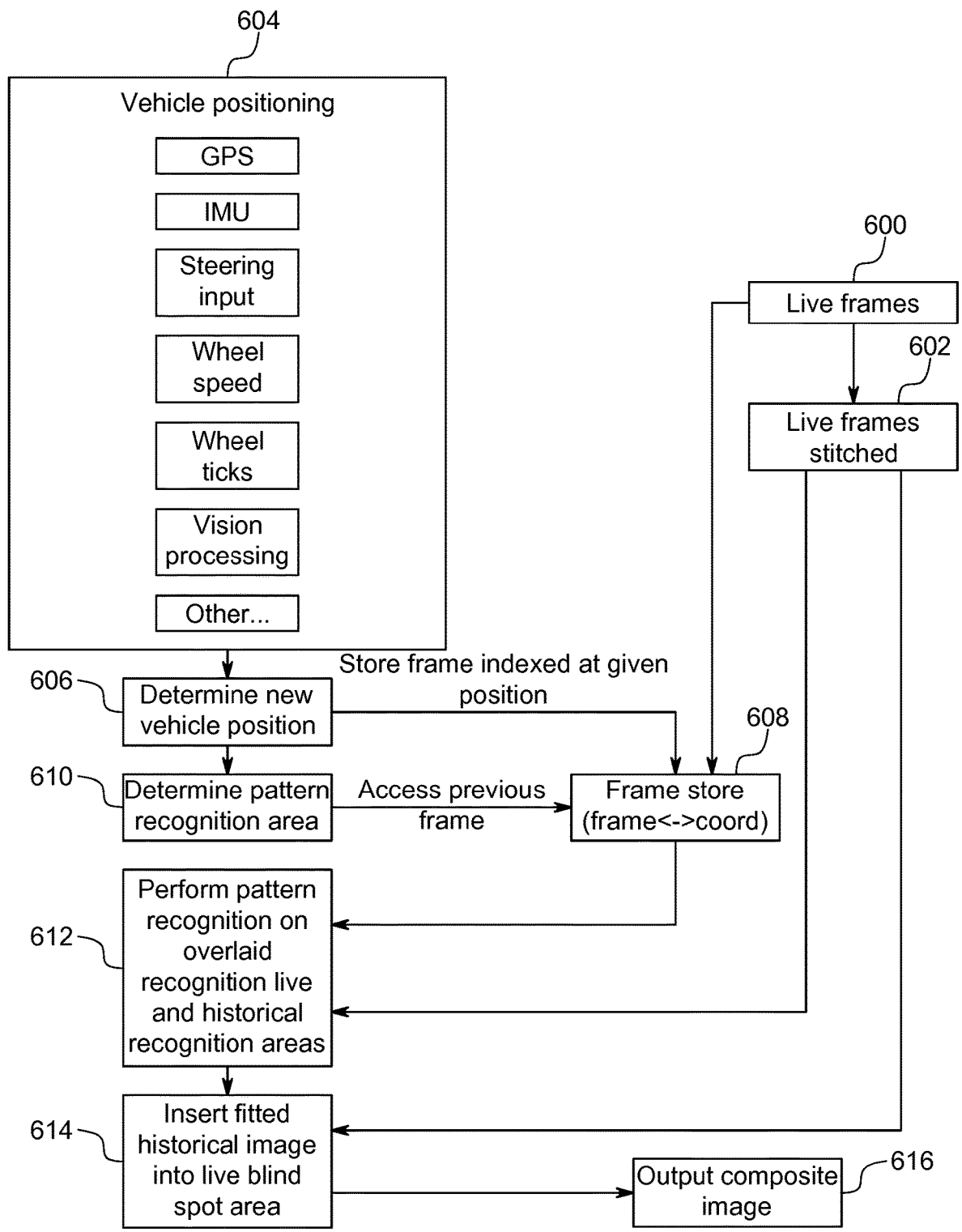
FIG. 6 illustrates a method for providing a composite image.

Referring now to FIG. 6, this illustrates a method of forming a composite image from live video images and historic video images. At step 600 live video frames are obtained from the vehicle camera system. The image data may be provided from one or more cameras arranged with views directed outwards from the vehicle, as previously explained. In particular, one or more cameras may be arranged to view in a generally downward direction in front of or behind the vehicle at a viewing point a predetermined distance ahead of the vehicle. It will be appreciated that such cameras may be suitably positioned to capture images of portions of the ground which may later be obscured by the vehicle.

At step 602 the live frames are stitched together to form the composite 3D image (for instance, the image "bowl" described above in connection with FIG. 5) or a composite 2D image. Suitable techniques for so combining video images will be known to a person skilled in the art. It will be understood that the composite image may be formed continuously according to the 3D images or processed on a frame-by-frame basis. Each frame, or perhaps only a portion of the frames such as every nth frame for at least some of the cameras, is stored for use in fitting historical images into a blank region of the composite image currently displayed (this may be referred to as a live blind spot area). For instance, where the bird's eye view composite image 500 of FIG. 5 is displayed on a screen, the live blind spot area is portion 502.

To constrain the image storage requirements, only video frames from cameras facing generally forwards (or forwards and backwards) may be stored as it is only necessary to save images of the ground in front of the vehicle (or in front and behind) that the vehicle may subsequently drive over in order to supply historic images for inserting into the live blind spot area. To further reduce the storage requirements it may be that not the whole of every image frame is stored. For a sufficiently fast stored frame rate (or slow driving speed) there may be considerable overlap between consecutive frames (or intermittent frames determined for storage if only every nth frame is to be stored) and so only an image portion differing from one frame for storage to the next may be stored, together with sufficient information to combine that portion with the preceding frame. Such an image portion may be referred to as a sliver or image sliver. It will be appreciated that other than an initially stored frame, every stored frame may require only a sliver to be stored. It may be desirable to periodically store a whole frame image to mitigate the risk of processing errors preventing image frames from being recreated from stored image slivers. This identification of areas of overlap between images may be performed by suitable known image processing techniques that may include pattern matching—that is, matching images or portions of images common to a pair of frames to be stored. For instance, pattern matching may use know image processing algorithms for detecting edge features in images, which may therefore suitably identify the outline of objects in images, those outlines being identified in a pair of images to determine the degree of image shift between the pair due to vehicle movement.

Each stored frame, or stored partial frame (or image sliver) is stored in combination with vehicle position information. Therefore, in parallel to the capturing of live images at step 600 and the live image stitching at step 602, vehicle position information is received at step 604. The vehicle position information is used to determine the vehicle location at step 606. The vehicle position may be expressed as a coordinate, for instance a Cartesian coordinate giving X, Y and Z positions. The vehicle position may be absolute or may be relative to a predetermined point. The vehicle position information may be obtained from any suitable known positioning sensor, for instance GPS, IMU, knowledge of the vehicle steering position and wheel speed, wheel ticks (that is, information about wheel revolutions), vision processing or any other suitable technique. Vision processing may comprise processing images derived from the vehicle camera systems to determine the degree of overlap between captured frames, suitably processed to determine a distance moved through knowledge of the time between the capturing of each frame. This may be combined with the image processing for storing captured frames as described above, for instance pattern matching including edge detection. In some instances it may be desirable to calculate a vector indicating movement of the vehicle as well as the vehicle position, to aid in determining the historic images to be inserted into the live blind spot area, as described below.

Each frame that is to be stored (or sliver), from step 600, is stored in a frame store at step 608 along with the vehicle position obtained from step 606 at the time of image capture. That is, each frame is stored indexed by a vehicle position. The position may be an absolute position or relative to a reference datum. Furthermore, the position of image may be given relative only to a preceding stored frame allowing the position of the vehicle in respect of each historic frame to be determined relative to a current position of the vehicle by stepping backwards through the frame store and noting the shift in vehicle position until the desired historic frame is reached. Each record in the frame store may comprise image data for that frame (or image sliver) and the vehicle position at the time the frame was capture. That is, along with the image data, metadata may be stored including the vehicle position. The viewing angle of the frame relative to the vehicle position is known from the camera position and angle upon the vehicle (which as discussed above may be fixed or moveable). Such information concerning the viewing angle, camera position etc. may also be stored in frame store 608, which is shown representing the image and coordinate information as (frame<->coord). It will be appreciated that there may be significant variation in the format in which such information is stored and the present invention is not limited to any particular image data or metadata storage technique, nor to the particulars of the position information that is stored.

At step 610 a pattern recognition area is determined. The pattern recognition area comprises the area under the vehicle that can't be seen in the composite image formed solely from stitched live images. Referring back to FIG. 5, the pattern recognition area comprises the blind spot 502. Coordinates for the pattern recognition area can be determined from the vehicle positioning information obtained at step 604 and as processed to determine the current vehicle position at step 606. Assuming highly accurate vehicle position information obtained at step 604, it will be appreciated that the current position of the vehicle may be exactly determined. Historic image data from frame store 608, that is, previously captured image frames, may be used to fill in blind spot 502 based on knowledge of the vehicle position at the time the historic images were captured. Specifically, the current blind spot may be mapped to an area of ground which is visible in historic images captured before the vehicle obscured that portion of the ground. The historic image data may be used through knowledge of the area of ground in the environment surrounding the vehicle in each camera image, as a result of the position of each camera upon the vehicle and the camera angle being known. As such, if the current vehicle position is known, image data showing the ground in the blind spot may be obtained from images captured at an earlier point in time before the vehicle obscures that portion of ground. Such image data may be suitably processed to fit the current blind spot and inserted into the stitched live frames. Such processing may include scaling and stretching the stored image data to account for a change in perspective from the outward looking camera angle to how the ground would appear if viewed directly from above. Additionally, such processing may include recombining multiple stored image slivers and/or images from multiple cameras.

However, the above described fitting of previous stored image data into a live stitched composite image is predicated on exact knowledge of the vehicle position both currently and when the image data is stored. It may be the case that it is not possible to determine the vehicle position to a sufficiently high degree of accuracy. As an example, with reference to FIG. 5, the true current vehicle position is represented by box 502, whereas due to inaccurate position information the current vehicle position determined at step 606 may be represented by box 504. In the example of FIG. 5 the inaccuracy comprises the determined vehicle position being rotated relative to the true vehicle position. Equally, translational errors may occur. Errors in calculating the vehicle position may arise due to the vehicle wheels sliding, where wheel ticks, wheel speed and/or steering input are used to determine relative changes in vehicle position. Where satellite positioning is used it may be the case that the required level of accuracy is not available.

It will be appreciated that where the degree of error in the vehicle position differs between the time at which an image is stored and the time at which it is fitted into a live composite image this may cause undesirable misalignment of the live and historic images. This may cause a driver to lose confidence in the accuracy of the representation of the ground under the vehicle. Worse still, if the misalignment is significant then there may be a risk of damage to the vehicle due to a driver being misinformed about the location of objects under the vehicle.

Due to risk of misalignment, at step 612 pattern matching is performed within the pattern recognition area to match regions of live and stored images. As noted above in connection with storing image frames, such pattern matching may include suitable edge detection algorithms. The determined pattern recognition region at step 610 is used to access stored images from the frame store 608. Specifically, historic images containing image data for ground within the pattern recognition area is retrieved. The pattern recognition area may comprise the expected vehicle blind spot and a suitable amount of overlap on at least one side to account for misalignment. Step 612 further takes as an input the live stitched composite image from step 602. The pattern recognition area may encompass portions of the live composite view adjacent to the blind spot 502. Pattern matching is performed to find overlapping portions of the live and historic images, such that close alignment between the two can be determined and used to select appropriate portions of the historic images to fill the blind spot. It will be appreciated that the amount of overlap between the live and historic images may be selected to allow for a predetermined degree of error between the determined vehicle position and its actual position. Additionally, to take account of possible changes in vehicle pitch and roll between a current position and a historic position as a vehicle traverses undulating terrain, the determination of the pattern recognition region may take account of information from sensor data indicating the vehicle pitch and roll. This may affect the degree of overlap of the pattern recognition area with the live images for one or more sides of the vehicle. It may not always be necessary to determine a pattern recognition area, rather the pattern matching may comprise a more exhaustive search through historic images (or historic images with an approximate time delay relative to the current images) relative to the whole composite live image. However, by constraining the region within the live composite image within which pattern matching to historic images is to be performed, and constraining the volume of historic images to be matched, the computational complexity of the task and the time taken may be reduced.

At step 614 selected portions of one or more historic images or slivers are inserted into the blind spot in the composite live images to form a composite image encompassing both live and historic images. As for the discussion above in connection with FIG. 2, the composite image may be further combined with graphical representations of one or vehicle component or system. For instance, a representation of the location and orientation of at least one, for instance all of, the wheels may be overlaid upon the composite image to provide the driver with further information concerning the alignment of the vehicle to aid in avoiding objects. The generation of such representations of vehicle components is as described above and will not be repeated here.

Furthermore, in addition to displaying a representation of the ground under the vehicle, a representation of the vehicle may be added to the output composite image. For instance, a translucent vehicle image or an outline of the vehicle may be added. This may assist a driver in recognising the position of the vehicle and the portion of the image representing the ground under the vehicle.

Where the composite image is to be displayed overlying portions of the vehicle to give the impression of the vehicle being transparent or translucent (for instance using a HUD or a projection means as described above), the generation of a composite image may also require that a viewing direction of a driver of the vehicle is determined. For instance, a camera is arranged to provide image data of the driver from which the viewing direction of the driver is determined. The viewing direction may be determined from an eye position of the driver, performed in parallel to the other steps of the method. It will be appreciated that where the composite image or a portion of the composite image is to be presented on a display in the vehicle which is not intended to show the vehicle being see-through, there is no need to determine the driver's viewing direction.

The combined composite image is output at step 616. As discussed above, the composite image output may be upon any suitable image display device, such as HUD, dashboard mounted display screen or a separate display device carried by the driver. Alternatively, portions of the composite image may be projected onto portions of the interior of the vehicle to give the impression of the vehicle being transparent or translucent. The present invention is not limited to any particular type of display technology.

Figure 7:
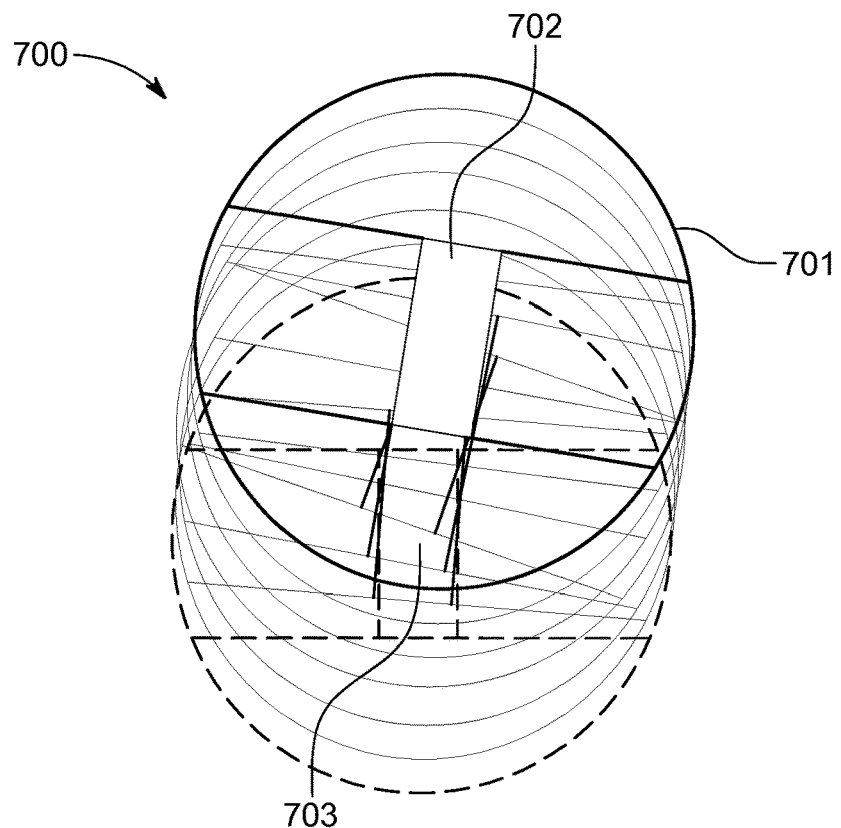
FIG. 7 illustrates a composite 2D image, specifically a bird's eye view, tracking a moving vehicle.

Referring now to FIG. 7, this illustrates the progression composites of live and historic images 703 as a vehicle 700 moves. In the example of FIG. 7 the composite image is represented as a bird eye view above the vehicle 700 and encompassing an 11 m bowl surrounding the vehicle 700, with the blind spot under the vehicle being filled with historic images 703. FIG. 7 shows the composite image tracking the vehicle location as it turns first right and then left (travelling from bottom to top in the view of FIG. 7), with the outline of each composite image being shown in outline. The current location of the vehicle is shown shaded as box 701. As noted above, the present invention is not limited to the presentation to the driver of a composite plan view of the car 700, its surroundings and the ground under the car. A 3D representation could be provided or any 2D representation derived from any portion of a 3D model, for instance that shown in FIG. 4, and viewed from any angle internal or external to the vehicle 700.

Figure 8:
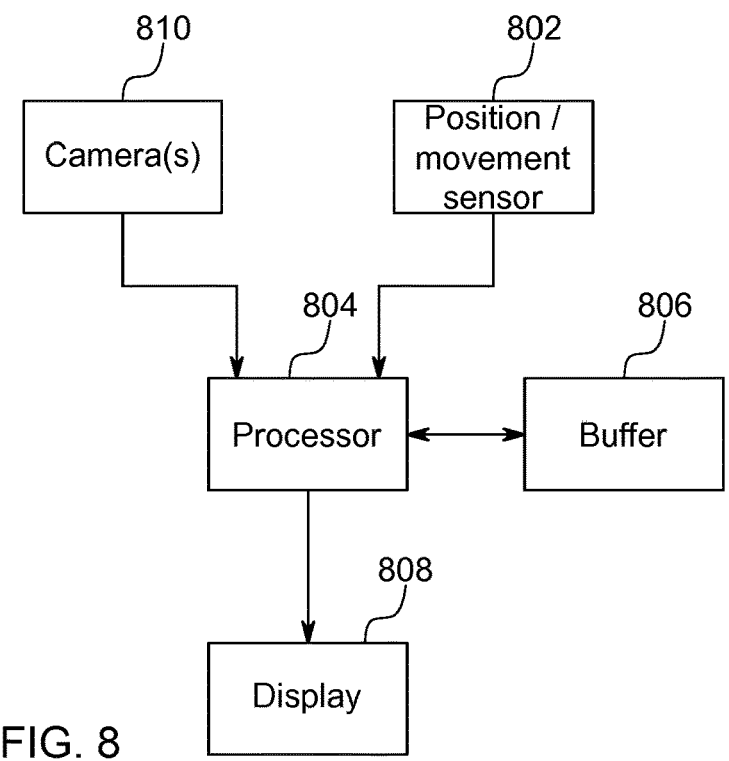
FIG. 8 illustrates an apparatus for implementing the method of FIG. 6.

FIG. 8 illustrates an apparatus suitable for implementing the method of FIG. 6. The apparatus may be entirely contained within a vehicle. One or more vehicle mounted camera 810 (for instance, that of FIG. 3) captures image frames used to form a live portion of a composite image or a historic portion of a composite image, or both. It will be appreciated that separate cameras may be used to supply live and historic images or their roles may be combined. One or more position or movement sensor 802 may be used to sense the position of the vehicle or movement of the vehicle. Camera 810 and sensor 802 supply data to processor 804 and are under the control of processor 804. Processor 804 buffers images from camera 810 in buffer 806. Processor 804 further acts to generate a composite image including live images received from camera 810 and historic images from buffer 806. The processor 804 controls display 808 to display the composite image. It will be appreciated that apparatus of FIG. 8 may be incorporated within the vehicle of FIG. 3, in which case camera 810 may be provided by one or more of cameras 310, 320. Display 808 is typically located in the vehicle occupant compartment or cabin and may take the form of a dashboard mounted display, or any other suitable type, as described above. Some portions of the image processing may be performed by systems external to the vehicle.

As described above, the formation of a composite image comprises the stitching together of live and historic images derived from a vehicle camera system. This may be to provide a composite image having a larger field of view than is achievable using live images alone, for instance including images for portions or areas of the environment underneath the vehicle or otherwise not visible within live images due to that area being obscured by the vehicle itself. As described above, the combination of live and historic images may require the accurate tracking of the position of the vehicle at the time each image is recorded (including the live images). Alternatively, matching (for instance, pattern matching) portions of live and historic images can be used to determine which parts of historic images to stitch into a composite image. Optionally, both techniques may be used as described in FIG. 6 in connection with determining a pattern recognition area. The first approach requires that vehicle position information is stored and associated with stored images.

To incorporate historic images into a composite image including live images as described above may involve a certain degree of image processing to scale and stretch historic images and/or live images to smoothly fit together. This may be true also for live images. However, the composite image may still appear disjointed. For an enhanced user experience, it may be desirable that the composite image has a uniform appearance such that it appears to have been captured by a single camera, or at least to minimise jarring differences between live and historic images are minimised. Such discontinuities may include colour and exposure mismatches. If uncorrected, composite image discontinuities may cause users to lose confidence in the accuracy of the information presented in a composite image, or to assume that there is a malfunction. It may be desirable that composite images appear to have been captured from a single camera, to give the appearance of the vehicle, or a portion of the vehicle, being transparent or translucent.

Such mismatches may result from changes in ambient lighting conditions between the time at which the live and historic images are captured (particularly when a vehicle is moving slowly) and changes in captured image properties arising from different camera positions (where multiple cameras are used and historic images are obtained from a different camera position compared with live images stitched adjacent to one another) or apparently different camera positions following stretching and scaling of historic images. Furthermore, the problem of differences in image properties between live and historic images may be exacerbated by the wide field of view cameras used within vehicle camera systems. Multiple light sources around the vehicle, or changes in light sources between live and historic images, may cause further variation. For instance, at night time, portions of a live image may be illuminated by headlights. Historic images will also include areas illuminated by headlights at the time at which the images were captured. However, for the current position of the vehicle that portion of the environment (for instance under the vehicle) would no longer be illuminated by the vehicles headlights. Certain embodiments of the present invention may serve to avoid the impression that areas under the vehicle in a composite image are being directly illuminated by headlights by ensuring that image properties for historic image portions match the image properties for adjacent live images.

According to certain embodiments of the present invention, composite image discontinuities between live and historic images may be mitigated by adjusting the image properties of the historic images, live images or both to ensure a higher degree of consistency. This may provide an apparently seamless composite image, or at least a composite image where such seams are less apparent. In some cases it may be preferable to adjust the image properties of only historic images, or adjust the image properties of historic images to a greater extent than those of live images. This may be because by their very nature live images may include or be similar to regions directly observable by the driver and it may be desirable to avoid the composite image appearing dissimilar to the directly observed environment.

According to certain embodiments, when images (or image slivers) are stored within a frame buffer or frame store, as described above in connection with step 608 of FIG. 6, the settings applied to the video image and/or captured image properties may also be stored. This may be alongside stored coordinate information. For instance, settings and captured image properties may be stored within an embedded data set of the image, as image metadata or separately and correlated within the stored images. At the time of combining live and historic images to form a composite image, the image properties or settings information may be compared between the live an historic image. The image properties of historic images, live images or both may be adjusted to reduce the appearance of discontinuity. It may be considered that this allows historic video data to be adapted to a live scene. Such image property adjustment may be across the whole of the historic image or the live images. Alternatively, image adjustment may be focused in the area of the seams or blended across image areas. As a further option, the whole or a substantial part of a historic image may be adjusted for consistency with images properties for images areas of a live image adjacent to the historic image in the stitched composite image. Advantageously, the last noted option may mitigate the effect of headlight illumination in historic images by adjusting their properties to conform to adjacent portions of a live image that are not directly illuminated by headlights. Each portion of historic or live image forming part of a composite image may be separately processed, or historic and live portions may be treated as single areas for the purpose of image property adjustment.

According to one embodiment when storing image properties an image processor may buffer a small number of frames, for instance four frames, and calculate average statistics to be stored in association with each frame. This may be performed for a rolling frame buffer. Additionally, or alternatively, this technique for averaging image properties across a small group of frames may be applied to live images to determine the image properties of live images for comparison with those of historic images. Such averaging may be referred to as filing the image properties through an averaging filter. Advantageously, such averaging techniques mitigate against the possible negative effects of a single historic or live image including radically different image properties compared with preceding or subsequent images. In particular, this reduces the impact of very short duration changes in brightness, which might otherwise cause flickering. Such short duration changes in brightness might occur when the vehicle passes through shadows, for instance under trees where dappled shade may rapidly adjust light levels between consecutively captured images. Beneficially, this also reduces the image of failure of the image property extraction function which might affect only one captured image in a series of captured images.

As an example, where the live images are averaged in this way each historic image or groups of historic images may be processed to match the current or rolling average image properties of live images. Specifically, taking the example of the image property under consideration being the image white balance (or more generally, colour balance), for each of a group of four live images the white balance WB may be calculated and averaged in accordance with equation (1) below to give the average white balance $AVG_{WB}$. Appropriate statistical techniques for the calculation of an image white balance, or other colour balance property, will be well known or available to the skilled person.

$$(WB_1+WB_2+WB_3+WB_4)/4=AVG_{WB} \quad (1)$$

From knowledge of the average white balance for a group of live images, the white balance for a historic image ($H_{WB}$) may be compared to determine a difference in white balance ($X_{WB}$) in accordance with equation (2). It will be appreciated that $X_{WB}$ may be positive or negative.

$$H_{WB}-AVG_{WB}=X_{WB} \quad (2)$$

Following the determination of the difference in white balance, the white balance of a historic image may be appropriately adjusted to conform to the live image average white balance in accordance with equation (3) to provide an adapted historic image white balance $H_{WB}'$. Appropriate techniques for adjusting the colour balance of an image will be known or available to the skilled person.

$$H_{WB}-X_{WB}=H_{WB}' \quad (3)$$

In equations (1) to (3) the respective WB or $H_{WB}$ property may be for a whole image or a portion of an image. In equations (2) and (3) above it will be appreciated that the historic white balance may also comprise the average white balance for a group of historic images. In both cases the group size may differ from four. The technique described above in connection with equations (1) to (3) may be equally applied to any other image property, for instance image exposure. Image property information for historic images may be stored per image (or image sliver) or per group of images. Where average image properties are stored this may be separately performed for images from each camera or averaged across two or more cameras. The stored image properties may be averaged across fixed groups of images or taken from a rolling image buffer and stored individually for each historic image.

As noted previously, in an alternative to equation (3) it may be that after calculating the difference in image properties between historic images and live images, that difference is applied to the live images such that the live images match the historic images by adding (for the example of white balance) the white balance difference $X_{WB}$ to the white balance WB for at least one live image. In some situations it may be disadvantageous to adjust the image properties of a live image. For instance, if a light source is within the field of view of a live image, adjusting the image properties of the live image to conform to a historic image could risk overexposure of the live image, resulting in the image appearing washed out. Additionally, as discussed above, it is desirable in some situations that live images appear as close as possible to how the environment surrounding the vehicle would appear if directly viewed by the driver.

Figure 9:
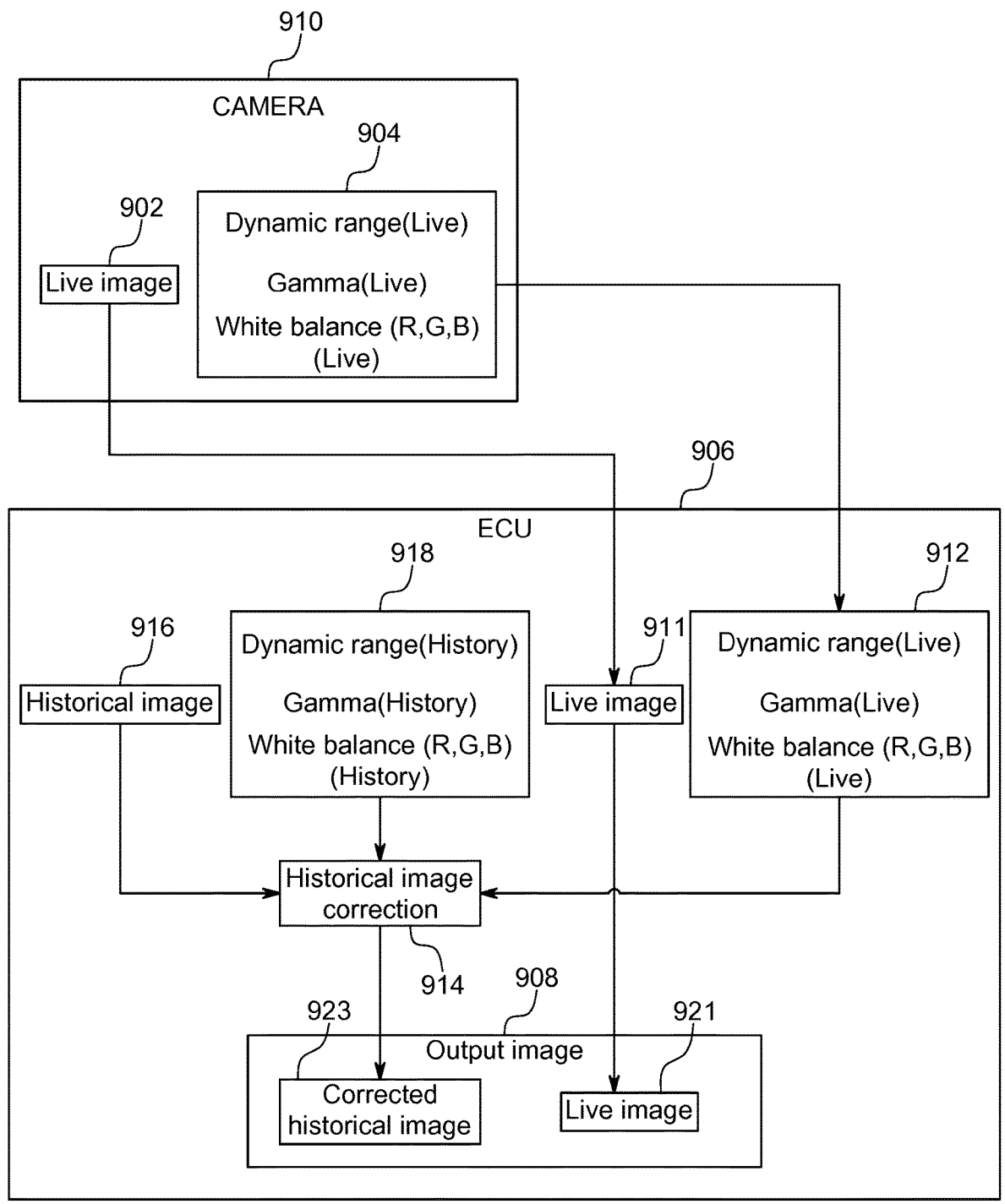
FIG. 9 illustrates a system for forming a composite image including the adjustment of image properties according to an embodiment of the invention.

The adjustment of image properties for historic or live images may be performed as part of step 612 illustrated in FIG. 6 and described above, during which historical images are fitted into a live image blind spot area during formation of a composite image. Referring now to FIG. 9, a system for forming a composite image focusing on the adjustment of image properties to avoid composite image discontinuities will now be described. FIG. 9 may be considered to be an expansion of the camera 810 and processor 804 portions of FIG. 8. It will be appreciated that the descriptions of FIGS. 6 and 9 are complementary though intended to elucidate different aspects of the generation of a composite image. In particular, the detailed explanation presented above regarding the determination of a pattern recognition area and pattern recognition for overlaid live and historic images is applicable to certain embodiments of the invention addressing image property adjustment as described below.

As previously described, a vehicle camera system may include one or more cameras 910. Camera 910 provides a live image as indicated at 902 and also provides an output 904 for one or more image property. The specific image properties identified in FIG. 9 at point 904, for live images, includes Dynamic Range, Gamma and White Balance (R,G, B). Further image properties (alternatively referred to herein as image characteristics) include Chroma and colour saturation. It will be appreciated that the present invention is not limited to these particular image properties in combination. Any image property or group of image properties that may be measured and adjusted to reduce image discontinuities in a composite image may be included, including image properties not explicitly listed. White Balance has been previously described. Colour balancing may be performed upon a three component image, for instance Red, Green, Blue. Any known measure of colour balance may be measured and output from camera 910 for a live image. Dynamic Range refers to the option for the camera 910 comprising a High Dynamic Range (HDR) camera in which multiple images are captured at different exposure levels. The dynamic range information indicates the range and/or absolute values for the exposure of each image. The multiple exposures may be combined to form a single image with a greater dynamic range of luminosity. Gamma is a measure of image brightness. It will be appreciated that alternative measures of image brightness may be used.

The live image data 902 and the corresponding image property data are supplied to the Electronic Control Unit (ECU) 906, though it will be appreciated that alternatively a separate image processing system may be used. The present invention is not restricted to any particular hardware or software implementation. Specifically, live images may be passed through directly to an output composite image 908 (for display on a vehicle display, for instance in the instrument cluster, and not illustrated in FIG. 9). Alternatively, at point 910 the live images may be processed for instance by appropriate scaling or stretching, or buffered, prior to being supplied to the output image 908. Similarly, the image property data for live images is received at point 912. Live image data 912 is used by the ECU as part of the historical image correction at point 914, for instance as described above in connection with equations (1) to (3) and as described in greater detail below in connection with FIG. 10. The historical image correction further takes as inputs stored historic images 916 and image property data 918 for historic images. The historic images 916 and image property data 918 for historic images may be buffered within the ECU 906 or separately buffered, for instance as shown in the separate buffer 806 of FIG. 8. It will be appreciated that the historic images 916 and the image property data 918 are ultimately derived from the camera system 910, though no direct connection is shown in FIG. 9 in the interests of simplicity.

The output image 908 includes both at least one live image 921 and at least one historic image 923, appropriately adjusted for consistency with the live image. The process whereby the images are stitched together to form an output composite image 908 has been described above in connection with FIG. 6.

Figure 10:
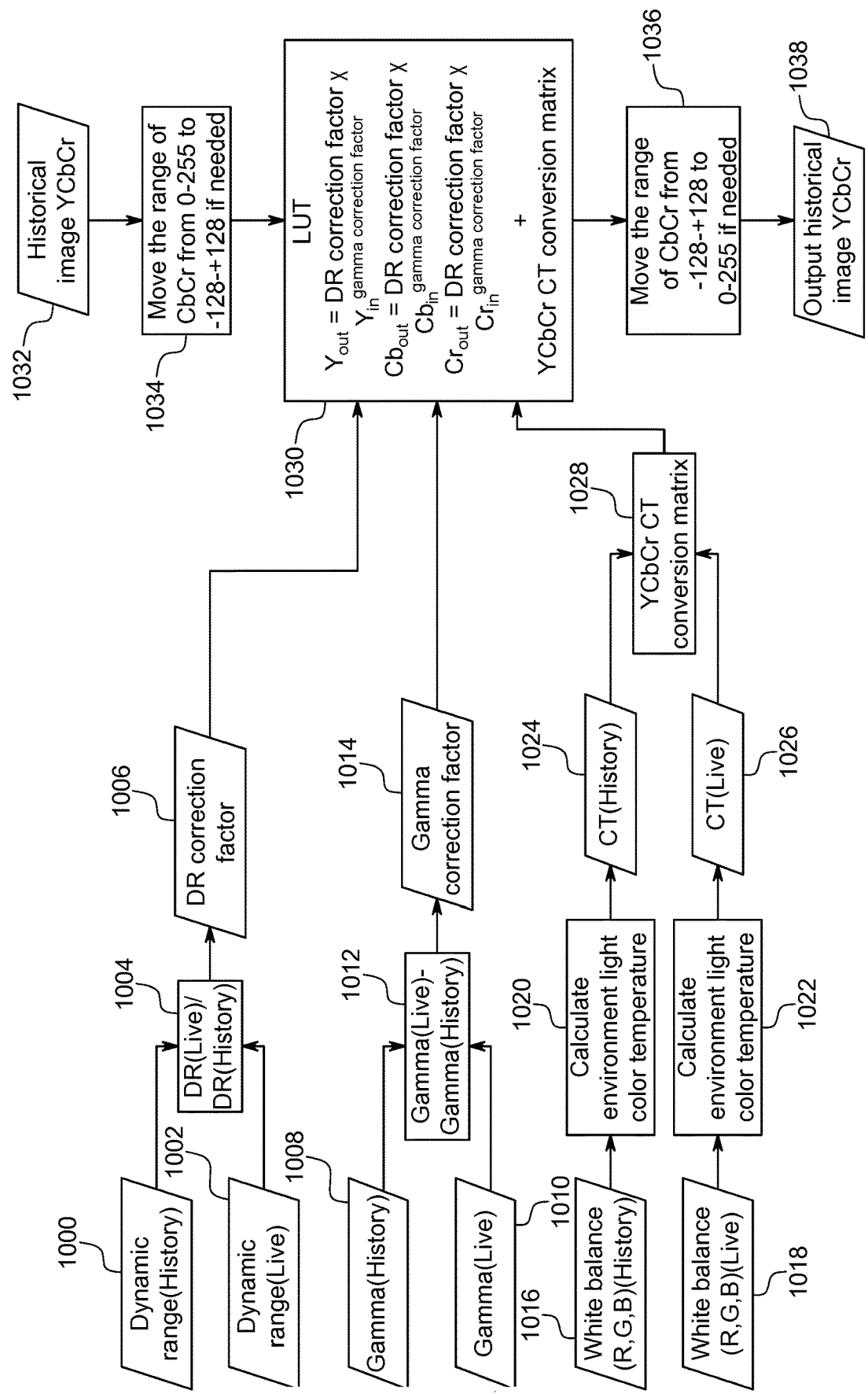
FIG. 10 illustrates a method of forming a composite image including the adjustment of image properties according to an embodiment of the invention.

Referring now to FIG. 10, a method for historic image correction in accordance with certain embodiments of the present invention will now be described in greater detail. Specifically, the method of FIG. 10 implements the historical image correction of part 914 of FIG. 9. The method takes as inputs a range of image properties for live and historic images. The method of FIG. 10 considers, for simplicity, a situation in which there is a single live and a single historic image to be presented side-by-side in a composite image and where it is desirable to adjust the image properties of the historic image or the live image. Three specific image properties are considered to perform this adjustment. Furthermore, FIG. 10 considers a situation in which each image property is calculated (and adjusted) in respect of the whole of each image. From the preceding discussion, the skilled person will readily appreciate how the method of FIG. 10 may be extensible to other situations in which multiple images are processed and/or only portions of images are processed, as well as alternative image properties being processed.

A first part of the image adjustment of FIG. 10 concerns the dynamic range of the live and historic images. The method receives as inputs a measure of the dynamic range for a historic image (step 1000) and a measure of the dynamic range for a live image (step 1002). Dynamic range of an image may be measured using a camera auto exposure control algorithm to adjust the exposure times based on the illumination of the scene. This exposure time-dynamic range relation may be unique to each sensor type because it is mainly dependent on sensitivity of the sensor and the auto exposure control algorithm of the Image Signal Processor (ISP).

At step 1004 a dynamic range correction factor is calculated by dividing the dynamic range of the live image by the dynamic range of the historic image to provide a dynamic range correction factor at step 1006. Dynamic Range (DR) is defined as DR=Lsat/Lmin in ISO 15730 as a camera dynamic range calculation method. This terminology is used to describe the scene dynamic range by sensor and ISP suppliers, where they take Lmin as the noise floor of the sensor. Knowing Lmin will be constant for our sensor and exposure values and weightings will be adjusted so that Lsat will be shown as digitally maximised in the image. A dynamic range correction can then be applied as gain to the formula.

Similarly, the method receives as inputs a measure of the gamma for a historic image (step 1008) and a measure of the gamma for a live image (step 1010). Gamma (also called a tone mapping curve) is provided by ISP or sensor suppliers as an adjustable curve vs DR. As the image is adapted to a new scene with a new DR, it is also necessary to compensate for gamma. Gamma is adaptive to the scene but it is acquired as part of an adaptive setting of a camera. It is not necessary to measure this from the camera, rather it may be dependent on the gamma calculation method of the ISP or sensor supplier. Gamma correction will be well known to the skilled person, for instance as described at https://en.wikipedia.org/wiki/Gamma_correction At step 1012 a gamma correction factor is calculated by subtracting the gamma of the historic image from the gamma of the live image to provide a gamma correction factor 1014.

Similarly, the method receives as inputs a measure of the white balance for a historic image (step 1016) and a measure of the white balance for a live image (step 1018). Colour temperature of the light in the scene is detected to apply white balance. The objective of white balance is to apply a correction factor to the image so that the colour temperature of the light in the scene will appear as white in the image.

At steps 1020 and 1022 an environmental light colour temperature (CT) is calculated separately for each of the historic image and the live image. An auto white balance algorithm requires knowledge of the colour temperature of the scene to apply corrected white balance. This may be specific for different sensor and ISP suppliers. The calculated environment light colour temperature is then used to provide inputs 1024 and 1026 in respect of the colour temperature of each image. At step 1028 the colour temperature of each image is used to determine a YCbCr conversion matrix, as will be well understood by the skilled person.

The dynamic range correction factor 1006, the gamma correction factor 1014 and the YCbCr conversion matrix 1028 may then be applied to the historic image (or part of the historic image) to appropriately adjust the historic image for consistency with the live image. In the method of FIG. 10 this image adjustment is performed by a Look Up Table (LUT) 1030, which advantageously reduces the computational demands placed upon the ECU or a separate image processing system. The LUT 1030 takes as an input 1032 the YCbCr information for a historic image. Specifically, the historic image data comprises YCbCr data in respect of each pixel. If required, this YCbCr data may be adjusted from a range of 0 to 255 for each pixel to a range of −128 to 128 for each pixel, at step 1034. In some embedded systems, Cb and Cr data is stored from 0-255, where their range is defined in YCbCr colour space from −128 to +128. Cb and Cr data format in an embedded system is implementation specific and so step 1034 may not be required or may differ for different implementations. The LUT then performs the image adjustment in respect of each pixel according to equation (4):

$$Y_{out} = \text{DR\_correction\_factor} * Y_{in}^{gamma\_correction\_factor} \quad (4)$$
$$Cb_{out} = \text{DR\_correction\_factor} * Cb_{in}^{gamma\_correction\_factor}$$
$$Cr_{out} = \text{DR\_correction\_factor} * Cr_{in}^{gamma\_correction\_factor} +$$
$$YCbCr \; CT \; \text{Conversion Matrix}$$

Step 1030 comprises the application of the correction factors to a historic image after they are calculated. The CT conversion matrix may comprise a 3×3 correction matrix applied to the corrected Y, Cb and Cr values for each pixel of the historic image. A look up table may be generated by first calculating all values from 0-255 for all YCbCr values. This can simplify processing of the historic image may requiring only look up in the table instead of making the calculation for each pixel.

At step 1036, if required the updated YCbCr data may be adjusted from a range of −128 to 128 for each pixel to a range of 0 to 255 for each pixel. In some embedded systems, Cb and Cr data is stored from 0-255, where their range is defined in YCbCr color space from −128 to +128. Cb and Cr data format in embedded system is implementation specific so step 1036 may be omitted of modified for different implantations. At step 1038 the updated historical image is output for further processing to be combined into a composite image, including by the pattern matching method of FIG. 6 or appropriate scaling and stretching (or this may precede the image property harmonisation method of FIG. 10).

It will be appreciated that the method of FIG. 10 is provided by way of example only and subject to modification according to the type and number of image properties which are calculated. In particular, the way in which image property correction factors are calculated and applied to image data may vary according to the image property types and desired degree of modification for historic images. As one example, calculated image property correction factors may be scaled to increase or decrease their effects, either in total or relative to other correction factors. As a further example, the correction factors may be scaled such that their effect varies across different areas of an image. Each image property may indicate a property of the image that can be derived or calculated from the image itself. Alternatively, an image property may indicate a setting of an imaging apparatus used to capture the image or an environmental factor prevailing when the image is captured, neither of which may be directly discernible from the image itself, but which may affect the appearance of the image.

It will be appreciated that embodiments of the present invention can be realised in the form of hardware, software or a combination of hardware and software. In particular, the method of FIGS. 6 and 11 may be implemented in hardware and/or software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A display method for use in a vehicle, the method comprising:

obtaining first and second images showing adjacent or overlapping regions external to the vehicle, the first and second images being captured at different points in time;

obtaining at least one image property for each of the first and second images;

calculating an image correction factor as a function of the at least one image property for each of the first and second images;

adjusting the appearance of either or both of the first image and the second image according to the calculated image correction factor;

obtaining information associated with the vehicle, wherein said information includes an angle and a position of at least one wheel of the vehicle;

generating a composite image from either the first image or an adjusted first image and either the second image or an adjusted second image; and displaying at least part of the composite image, wherein the displayed at least part of the composite image comprises a 3-Dimensional (3D) representation or a 2-Dimensional (2D) representation of an environment surrounding the vehicle and extending at least partially into an area underneath the vehicle that is obscured by a bonnet of the vehicle from a view of a driver of the vehicle during operation of the vehicle, further wherein the displayed at least part of the composite image includes a representation of the at least one wheel of the vehicle and said angle and position;

wherein the first image is captured at a first point in time and the second image is captured at a second, later point in time, the vehicle having moved position between the first and second points in time;

wherein the first image is a time-delayed image and the second image is a live image; and wherein for the second image, the at least one image property is obtained in respect of the group of live images including the second image.

2. A display method according to claim 1, wherein the group of images including either the first image or the second image comprises two or more images captured consecutively by a single image capture apparatus.

3. A display method according to claim 1, wherein the image property obtained in respect of the group of images including the first or second image comprises an average of image properties obtained in respect of each of the group of images.

4. A display method according to claim 1, wherein the first and second images are captured by at least one image capture apparatus mounted upon or within the vehicle to capture images of the environment external to the vehicle.

5. A display method according to claim 1, wherein the at least one image property is indicative of a characteristic of the image, a setting of at least one image capture apparatus used to capture the image, or an environmental factor at the time the image was captured.

6. A display method according to claim 1, wherein the first image is buffered prior to its use to generate a composite image.

7. A display method according to claim 6, wherein the at least one image property in respect of the first image is stored in association with the first image.

8. A display method according to claim 1, wherein the first and second images are captured by a single vehicle mounted camera or separate vehicle mounted cameras.

9. A display method according to claim 1, wherein adjusting the appearance of either or both of the first image and the second image according to the calculated image correction factor comprises adjusting the whole or only a portion of the selected first and/or second image.

10. A display method according to claim 1, wherein for at least one of the first or second image the obtained at least one image property is in respect of the whole or only a portion of said image.

11. A display method according to claim 10, wherein the portion of the image comprises an image portion which overlaps with or is adjacent to the other of the first and second images.

12. A display method according to claim 1, wherein the at least one image property comprises at least one selected from a group consisting of: a white balance, image gamma, dynamic range, Chroma, and colour saturation.

13. A display method according to claim 1 wherein the composite image is displayed such as to overlie a portion of an image of the vehicle to give the impression of the portion of the vehicle being at least partly transparent.

14. A non-transitory computer-readable medium storing computer program code which is arranged when executed to implement the method of claim 1.

15. A display apparatus for use with a vehicle, comprising:

an image capture apparatus arranged to obtain first and second images showing adjacent or overlapping regions external to the vehicle, the first and second images being captured at different points in time;

a display arranged to display a composite image;

a storage means arranged to store image data; and a processor arranged to:

obtain at least one image property for each of the first and second images;

calculate an image correction factor as a function of the at least one image property for each of the first and second images;

adjust the appearance of either or both of the first image and the second image according to the calculated image correction factor;

obtain information associated with the vehicle, wherein said information includes an angle and a position of at least one wheel of the vehicle;

generate a composite image from either the first image or an adjusted first image and either the second image or an adjusted second image; and cause the display to display at least part of the composite image, wherein the displayed at least part of the composite image comprises a 3-Dimensional (3D) representation or a 2-Dimensional (2D) representation of the environment surrounding the vehicle and extending at least partially into an area underneath the vehicle that is obscured by a bonnet of the vehicle from a view of a driver of the vehicle during operation of the vehicle, further wherein the displayed at least part of the composite image includes a representation of the at least one wheel of the vehicle and said angle and position;

wherein the first image is captured at a first point in time and the second image is captured at a second, later point in time, the vehicle having moved position between the first and second points in time;

wherein the first image is a time-delayed image and the second image is a live image; and wherein for the second image, the at least one image property is obtained in respect of the group of live images including the second image.

16. A vehicle comprising the display apparatus of claim 15.

17. A display apparatus arranged to:
obtain first and second images showing adjacent or overlapping regions external to the vehicle, the first and second images being captured at different points in time;
obtain at least one image property for each of the first and second images;
calculate an image correction factor as a function of the at least one image property for each of the first and second images;
adjust the appearance of either or both of the first image and the second image according to the calculated image correction factor;
obtain information associated with the vehicle, wherein said information includes an angle and a position of at least one wheel of the vehicle;
generate a composite image from either the first image or an adjusted first image and either the second image or an adjusted second image; and
display at least part of the composite image, wherein the displayed at least part of the composite image comprises a 3-Dimensional (3D) representation or a 2-Dimensional (2D) representation of the environment surrounding the vehicle and extending at least partially into an area underneath the vehicle that is obscured by a bonnet of the vehicle from a view of a driver of the vehicle during operation of the vehicle, further wherein the displayed at least part of the composite image includes a representation of the at least one wheel of the vehicle and said angle and position;
wherein the first image is captured at a first point in time and the second image is captured at a second, later point in time, the vehicle having moved position between the first and second points in time;
wherein the first image is a time-delayed image and the second image is a live image; and
wherein for the second image, the at least one image property is obtained in respect of the group of live images including the second image.

* * * * *